June 16, 1964 T. L. CLINE 3,137,516

SAFETY BUMPER HAVING ILLUMINATED RECESS FOR LICENSE PLATE

Filed April 12, 1963

INVENTOR.
TED L. CLINE

BY Dunlap, Laney & Hubbard
ATTORNEYS

United States Patent Office 3,137,516 Patented June 16, 1964

3,137,516
SAFETY BUMPER HAVING ILLUMINATED RECESS FOR LICENSE PLATE

Ted L. Cline, P.O. Box 38, Rush Springs, Okla.
Filed Apr. 12, 1963, Ser. No. 272,781
3 Claims. (Cl. 280—505)

This invention relates to a bumper of the type used at the rear end of the body of a truck or similar vehicle for permitting the truck to be pushed by another vehicle, or for permitting the truck to be backed against stationary objects without damage to the truck.

Various types of rear bumpers for trucks and similar vehicles have heretofore been devised with the object of the variations in structure and design between bumpers being that of better adapting the bumpers for the performance of several functions. For example, it is customary practice to provide an indentation or relieved portion of the bumper for the accommodation of a license plate, and it is also customary practice in the construction of the rear bumpers of trucks to provide an aperture in the bumpers to permit a trailer or other towed vehicle to be hitched to the truck through the bumper.

The bumper of the present invention may be broadly described as comprising an elongated metal guard member having a length at least equal to the width of the truck to which the bumper is to be attached with an indentation or recess formed in said guard member at a point substantially intermediate its ends for the accommodation of a license plate. One of the surfaces defining the indentation in the guard member is adapted to support a light or other source of illumination for the license plate.

More specifically, the indentation in the elongated metal guard member is defined by a pair of converging vertically extending side plates, a bottom plate and a vertically extending back plate which is adjacent the truck. The bottom plate is provided with three apertures which are positioned in a line extending transversely across the rear end of the truck so that a trailer or towed vehicle may be connected to the bumper through one of these apertures according to whether it is desired to tow the trailer in laterally offset relation with respect to the truck or to tow the trailer directly behind the truck. One of the vertically extending side plates is apertured to receive a socket for a suitable light bulb which provides a source of illumination for a license plate which is mounted on the vertically extending back plate and which faces traffic approaching from the rear of the truck. The opposite vertical side plate from that which supports the light bulb or source of illumination is provided with a weakened knockout portion which may be removed in order to provide an aperture for the mounting of a trailer brake if desired. One embodiment of the bumper further includes a pair of apertured safety chain brackets which are secured to the upper edges of the horizontally spaced, vertically extending, converging side plates and extend toward each other over the indentation formed in the guard member of the bumper. These safety chain brackets permit one or a pair of safety chains to be secured to the bumper for use in towing certain vehicles in a manner well understood in the art.

The construction of the elongated metal guard member of the bumper is such that a broad horizontal step plate is provided which extends across the rear end of the truck parallel to the ground and facilitates the use of the bumper as a step for gaining access to the bed of the truck when desired. The bumper is also provided with a vertically extending projecting protector plate which extends across the space between the step plate and the body of the truck to improve the appearance of the bumper when mounted on the truck. The protector plate also provides further support for the license plate mounted in the indentation in the elongated metal guard member.

It is an object of the present invention to provide an improved bumper for attachment to the rear end of trucks or similar vehicles which permits a trailer vehicle to be more easily connected to the truck in one of several ways according to whether the trailer is intended to be towed in an off-center or laterally displaced position, or whether the trailer is to be towed directly behind the truck in longitudinal alignment therewith. The bumper of the invention further permits the license plate of the truck to be more easily secured to the bumper in a protected position where the license plate is shielded against being struck or bent by a pushing vehicle.

A further object of the invention is to provide means for mounting a suitable light in a protected location on the bumper so that the light affords full illumination of the license plate carried by the bumper. The light is protected from destructive forces acting in both vertical and horizontal planes, and is secured to the bumper in a way which permits it to be easily mounted and removed therefrom.

A further object of the invention is to provide a bumper for trucks and the like which permits a safety chain to be easily secured thereto for use in towing trailers and similar vehicles.

Other objects and advantages of the invention will become apparent from the following detailed description thereof when considered in conjunction with the accompanying drawing which illustrates the invention.

Figure 1:
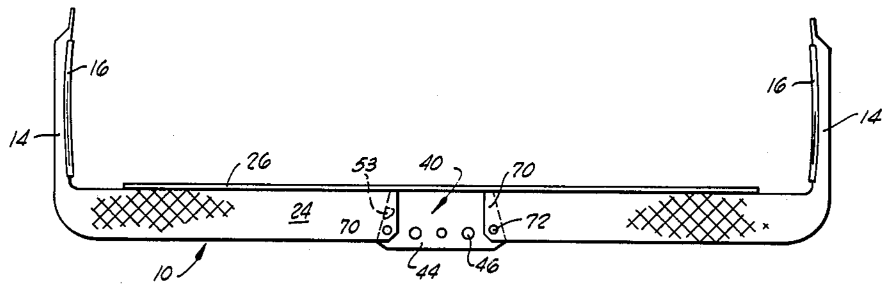
FIGURE 1 is a plan view of one embodiment of the present invention.
Figure 2:
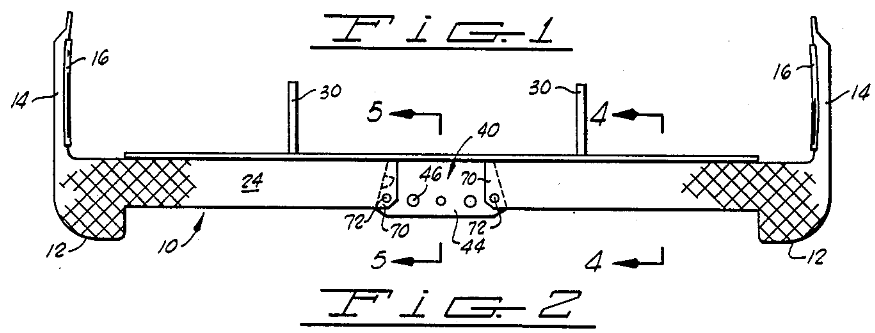
FIGURE 2 is a plan view of a second embodiment of the present invention.
Figure 3:
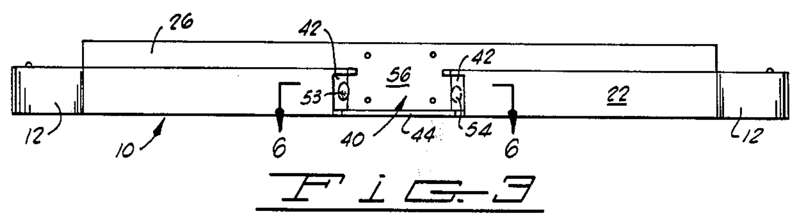
FIGURE 3 is a view in elevation of the embodiment of the invention shown in FIGURE 2 showing the bumper as it would appear when viewed from the rear of the truck to which it is mounted.
Figure 5:
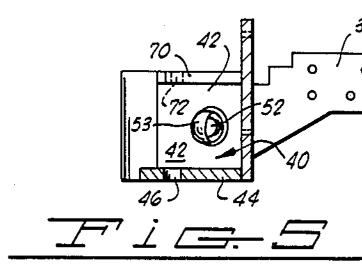
FIGURE 5 is a sectional view taken along line 5—5 of FIGURE 2.
Figure 6:
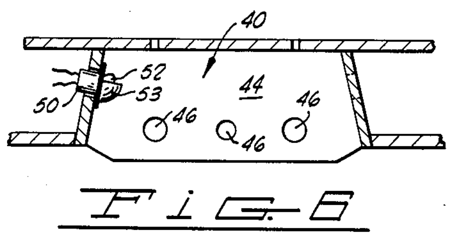
FIGURE 6 is a view in section taken along line 6—6 of FIGURE 3.

Referring now to the drawings in detail and particularly to FIGURES 1 through 3, the bumper of the invention comprises an elongated metal guard member 10 having a length which is at least equal to the width of the truck to which the bumper is to be attached so that the guard member may extend completely across the rear end of the truck. In the embodiment of the invention shown in FIGURES 2 and 3, the guard member 10 is provided adjacent its opposite ends with a pair of rearwardly extending portions 12 which define between them a space to accommodate the tail gate of a truck when it is lowered. This embodiment of the invention will hereinafter be referred to as the drop tail gate form of the bumper and is utilized in preference to the embodiment of the invention shown in FIGURE 1 when it is desirable or necessary to frequently drop the tail gate of the truck to which the bumper is mounted to a position in which the tail gate occupies as nearly as possible a vertical plane rather than being inclined at a substantial angle with respect to the vertical.

Figure 7:
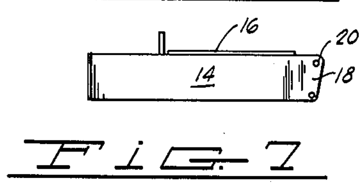
FIGURE 7 is a view in elevation of the bumper as it appears when viewed from one end thereof.
Figure 4:
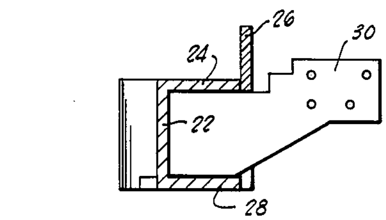
FIGURE 4 is a view in section taken along line 4—4 of FIGURE 2.

At each end of the elongated metal guard member 10 is secured a wraparound member 14 which extends substantially normal to the guard member 10 and is adapted to extend forwardly along the fender skirts or rear portion of the body of the truck to which the bumper is mounted. The wraparound portions 14 are provided on their inside surfaces with a protective plate 16 of rubber or other soft resilient material which prevents the wraparound members 14 from scratching or marring the body of the truck. Preferably, the wraparound members 14 are formed integrally with the guard member 10 as shown in FIGURES 1 and 2. As shown in FIGURE 7, the wraparound members 14 are provided at the ends 18 with apertures 20 to permit the wraparound members to be bolted to the fender skirts or truck body if desired.

The elongated metal guard member 10 comprises an elongated guard plate 22 which extends substantially vertically with respect to the ground when the bumper is mounted upon the truck, and a horizontally extending step plate 24 which is secured at one of its edges to the upper edge of the vertically extending guard plate. The step plate 24 is of sufficient width to provide a platform for supporting a person who desires to step upon the bumper to gain access to the bed of the truck. Preferably, the step plate 24 is provided with protuberances or raised portions to prevent slipping by a person standing upon the step plate.

A protective plate 26 is secured to the edge of the step plate 24 adjacent the truck to which the bumper is secured. The protective plate 26 extends upwardly from the step plate 24 and bridges the gap which would otherwise exist between the bumper and the body of the truck. The protective plate thus aids in shielding the bumper and vehicles to the rear of the truck from mud and water thrown to the rear of the truck by the wheels thereof, adds to the attractive appearance of the bumper and, as will be subsequently explained, provides enhanced structural strength and an additional supporting surface for mounting a license tag secured to the bumper.

The elongated metal guard member 10 further includes a horizontal reinforcing plate 28 which extends parallel to the step plate 24 and is secured by one of its longitudinal edges to the lower edge of the guard plate 22. In a preferred embodiment of the invention, the elongated metal guard member comprising the step plate 24, guard plate 22 and reinforcing plate 28 is integrally formed so that these members actually constitute a U-shaped channel member.

To facilitate the securement of the bumper to the frame of a truck to which the bumper is to be attached, a pair of horizontally spaced braces 30 are attached to the bumper by welding or otherwise suitably securing one end of each of the braces in the U-shaped channel formed by the step plate 24, the guard plate 22 and the reinforcing plate 28. The opposite ends of the braces 30 are apertured to facilitate the securement by bolts or other suitable means of the braces to the frame of the vehicle to which the bumper is to be attached.

The portion of the present invention which has been thus far described does not differ materially from the previous bumper constructions which have been commercially available. The novel and highly useful aspects of the invention reside in the construction of the indentation 40 which is provided at about the midpoint of the elongated metal guard member for the purpose of accommodating a license tag or plate to be mounted upon the member, and for supporting means for illuminating the license plate.

The indentation 40 in the elongated metal guard member 10 is defined by a pair of horizontally spaced, vertically extending mounting plates 42 which are angled with respect to the longitudinal axis of the vehicle to which the bumper is mounted, and by a horizontal bottom plate or hitch plate 44 which is secured across the bottom of the indentation 40 and provided with a plurality of aligned, horizontally spaced apertures 46 which facilitate the securement to the bumper of a trailer or other vehicle to be towed. The horizontally spaced, vertically extending mounting plates 42 are secured at their upper edges to the step plate 24, at their lower edges to the hitch plate 44 and reinforcing plate 28, and at their rear edges to the guard plate 22. The guard plate 22 and step plate 24 are cut away at a central portion thereof so that these members terminate at the horizontally spaced, vertically extending mounting plates 42. In other words, the guard plate 22 and step plate 24 may be described as segmented, and joined together along intersecting longitudinal edges to form a pair of generally L-shaped members which are spaced horizontally from each other. One of the horizontally spaced, vertically extending mounting plates 42 is provided with an aperture in which a suitable light bulb socket 50 may be mounted so that a light bulb 52 or other suitable source of illumination may be employed to illuminate the interior of the recess 40, and particularly a license tag which is mounted on the bumper in a manner hereinafter described. The light bulb 52 is preferably enclosed in a light shield 53 which directs light rearwardly against the license tag, but shields the light bulb 52 from the vision of drivers of vehicles following the truck upon which the bumper is mounted. The second vertically extending mounting plate 42 is provided with a weakened generally circular portion 54 which defines a knockout plug which may be removed by hitting the plug with a hammer. An aperture may thus be easily provided in the second vertically extending mounting plate 42 to facilitate the mounting thereon of a trailer brake connection.

In a preferred construction of the invention, the protective plate 26 is extended downwardly at the recess 40 to provide a back plate 56 which is suitably apertured to facilitate the mounting thereon of a license tag or plate (not shown). The size of the indentation 40 as measured along the longitudinal axis of the metal guard member 10 is just sufficient to accommodate a regular vehicle license tag which is fairly standard in length throughout the United States. Maximum illumination of the license tag is thus obtained from the bulb 52.

In order to further protect the socket 50, bulb 52 and the license tag which is secured to the back plate 56, a pair of generally triangular shaped, safety chain brackets 70 are secured to the cut away edges of the step plate 24 and extend toward each other into the indentation 40. The safety chain brackets 70 are of a sufficient size to vertically cover the socket 50, light bulb 52 and light shield 53, but do not extend into the indentation 40 a sufficient distance to obstruct access to the apertures 46 in the hitch plate 44 or obscure the license tag. Each of the safety chain brackets 70 is provided with an aperture 72 to facilitate the securement thereto of one or a pair of safety chains to be used to enhance the safety with which a trailer or towed vehicle may be attached to a truck upon which the bumper of the invention is mounted.

*Operation*

The bumper of the present invention is mounted upon a truck or other vehicle to which it is to be secured by bolting the horizontally spaced braces 30 to the frame of the truck so that the elongated metal guard member 10 extends transversely across the truck at the rear end thereof. If desired, the bumper may be further secured to the body or fender skirts of the truck by bolting the wraparound portions of the elongated metal guard member to the body of the truck. In the described position of attachment to the truck, the elongated metal guard member 10 extends across the rear end of the truck to provide protection of the truck body against being backed into a massive stationary object and also provides a member to receive the impact of a pushing vehicle and transmit the pushing force to the truck.

A license tag is secured in the recess 40 of the bumper with its rear surface flatly abutting against the plate 26 and the back plate 56 which defines one side of the recess 40. In this position, the license plate is protected from being contacted by the bumper of a pushing vehicle and is also shielded from impingement from flying rocks or other objects which may be propelled toward the truck when the truck passes other vehicles moving in the opposite direction upon gravel roads and the like.

An important feature of the invention is the disposition of the source of light by which the license tag secured to the bumper is illuminated. Thus, the socket 50 and light bulb 52 are mounted upon one of the vertically extending mounting plates 42 in a position such that they are shielded from objects falling or propelled downwardly from above the light, and are also protected against contact with the bumper of a vehicle which may be used to push the truck. It will also be noted that the angular orientation of the mounting plate 42 assures that a maximum amount of light from the light source 52 will be directed upon the license tag supported upon the back plate 52. The license tag may thus be easily read from a substantial distance behind the truck upon which the bumper of the present invention is mounted.

The hitch plate 44 provides a strong connecting member by which a trailer or towed vehicle may be connected to the truck through the bumper. As has previously been mentioned, the several apertures 46 in the hitch plate 44 are horizontally spaced from each other so that the hitch can be offset with respect to the longitudinal axis of the truck in those types of towed vehicles, such as certain farm implements, which are pulled behind the truck and to one side thereof. By the use of the bumper of the present invention, these vehicles may be more easily connected to the truck and may be towed with greater safety. The safety chain brackets 70 provide protection for the license tag and for the light bulb 52 and socket 50, and at the same time afford a strong and accessible connection for one or a pair of safety chains to be used in securing a trailer vehicle to the truck.

If it should be desired to install a trailer brake connection or brake light upon the bumper of the invention, this may be accomplished by removing the knockout plug 54 of the vertically extending mounting plate 42 and installing these accessories at this point on the bumper.

Although it is appreciated that the novel aspects of the bumper of the present invention do not constitute an innovation in the presently existing bumper types which is of pronounced obscurity, and that the novel features of the present invention do not require vast or even substantial changes in existing structures, it is believed that the provision of the license tag illuminating light in a strategic and properly oriented position with respect to the license tag, and in a position which affords maximum protection to the light is a worthwhile and patentable development with respect to bumpers previously devised. The bumper of the invention is versatile in the many uses to which it may be adapted and is characterized by a long and trouble-free operating life.

Although a number of modifications and innovations in the precise structure of the invention will occur to those skilled in the art, if changes of this type do not depart from the utilization of the basic concepts which underlie the invention, such changes are intended to be circumscribed by the spirit and scope of the invention except as the same may be necessarily limited by the appended claims or reasonable equivalents thereof.

I claim:

1. A license plate supporting rear bumper for attachment to a truck or the like comprising:

a pair of flat, elongated step plates positioned in coplanar, horizontally spaced, longitudinal alignment with each other;

a flat, vertically extending plate secured at one of its longitudinal edges to one of the longitudinal edges of each of said step plates and retaining said step plates in horizontally spaced relation to each other, said flat, vertically extending plate extending from one end of said bumper to the other end thereof;

a pair of elongated guard plates each secured at one longitudinal edge at substantially a right angle to one longitudinal edge of one of said step plates to form a pair of horizontally spaced, generally L-shaped members, said L-shaped members being spaced apart to provide a license plate accommodating indentation;

a pair of horizontally, transversely spaced, generally vertically extending mounting plates each secured at their upper edges to said step plates adjacent the proximal ends of said step plates, said horizontally spaced, generally vertically extending mounting plates being located in converging vertical planes and forming the sides of an open, license plate accommodating box positioned in the center of said bumper;

a generally horizontally extending hitch plate secured between said mounting plates, said hitch plate having at least one aperture therein for hitching trailer vehicles to said truck;

a vertically extending back plate connected across the vertically extending free edges of said mounting plates which are closest to each other by reason of the convergence of said mounting plates, said back plate being adapted to support a license plate vertically superimposed thereon;

a pair of safety chain brackets secured to the upper edge of said mounting plates and extending into said license plate accommodating box over said hitch plate by a distance which avoids obscurement by said safety chain brackets of a license plate carried by said back plate, said safety chain brackets each being spaced vertically from said hitch plate, said safety chain brackets including means for attaching at least one safety chain to said brackets;

an electrical light socket mounted on one of said mounting plates in the space between one of said safety chain brackets and said hitch plate;

a light bulb in said electrical light socket and extending substantially normal to the surface of said one mounting plate; and a light shield positioned on the opposite side of said light bulb from said back plate whereby said light bulb is protected on all sides by said shield, said back plate, said hitch plate and said safety chain bracket from destruction by flying rocks and obscurement by mud, yet is readily accessible for replacement and repair via said open license plate accommodating box.

2. A license plate supporting rear bumper for attachment to a truck or the like as claimed in claim 1 and further characterized to include a weakened knockout plug section in the other of said mounting plates and facilitating the mounting of a trailer brake connection in said other mounting plate.

3. A license plate supporting rear bumper for attachment to a truck or the like as claimed in claim 1 wherein said hitch plate is provided with a plurality of transversely spaced and aligned apertures whereby trailer vehicles may be hitched to said truck at varying distances offset from the longitudinal axis of said truck.

References Cited in the file of this patent

UNITED STATES PATENTS

| | | |
|---|---|---|
| 2,196,115 | Jacobson | Apr. 2, 1940 |
| 2,197,737 | Appleton | Apr. 16, 1940 |
| 2,452,785 | Olney | Nov. 2, 1948 |
| 2,492,914 | Barden | Dec. 27, 1949 |
| 2,707,650 | Lawton | May 3, 1955 |
| 2,726,589 | Todd | Dec. 13, 1955 |